Dec. 6, 1932.  J. T. TERRY  1,889,907
ELECTRIC ARC FURNACE
Filed June 10, 1931
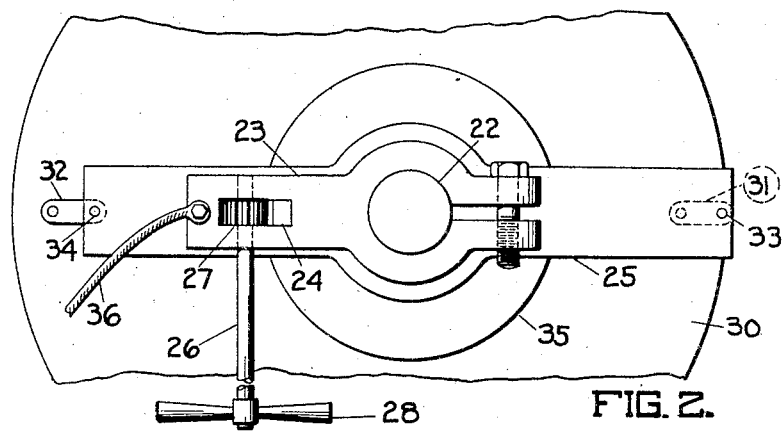
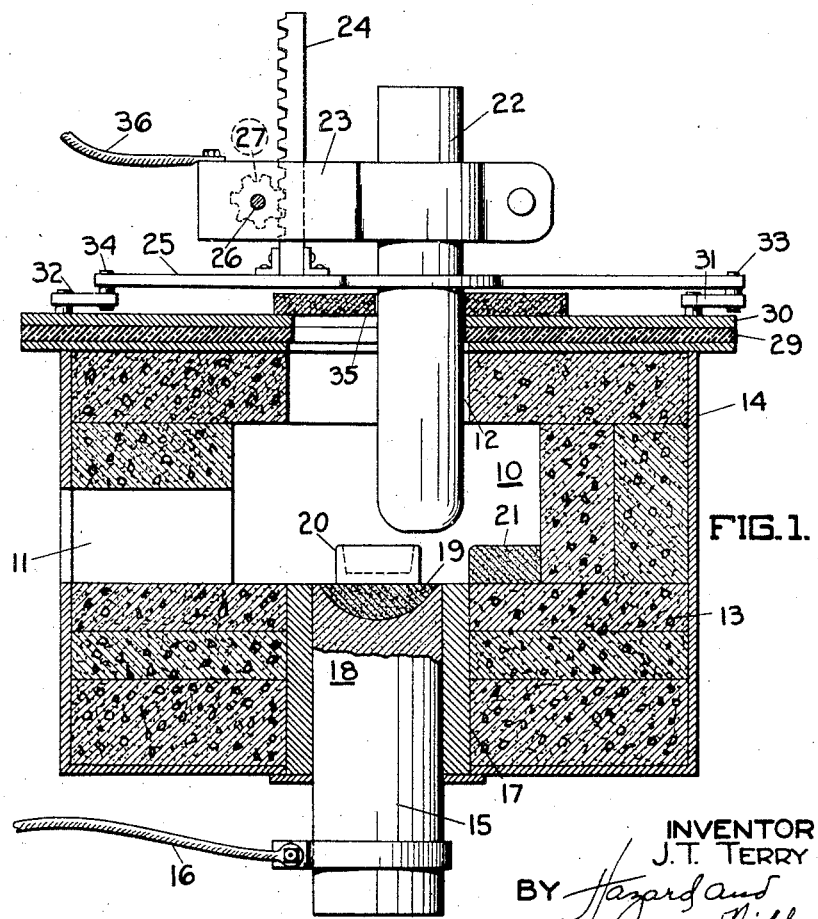
INVENTOR
J. T. TERRY
BY Hazard and
Miller
ATTORNEYS Patented Dec. 6, 1932

1,889,907

UNITED STATES PATENT OFFICE

JOSEPH T. TERRY, OF GLENDALE, CALIFORNIA

ELECTRIC ARC FURNACE

Application filed June 10, 1931. Serial No. 543,345.

This invention relates to improvements in electric furnaces and concerns a furnace of the type used for developing extremely high heats, such as in the production of tungsten carbide. In furnaces of this type it has been customary to place tungsten powder in a small carbon crucible or boat which is positioned in the arc chamber and strike an arc between the contents of the boat and the upper electrode. Ordinarily the upper electrode is allowed to remain stationary with the arc passing from the electrode to and through the contents of the boat. The result of such procedure is that the carbon present in the upper electrode and in the boat supplies the necessary carbon to convert the carbon to tungsten carbide under the extreme heat. However, when the upper electrode is allowed to remain stationary the arc has a tendency to remain stationary so that there is no even distribution of the heat or of the carbon and as a result the tungsten carbide produced is not of a homogeneous character. Another disadvantage resulting from striking an arc between the upper electrode and the contents of the boat or crucible is that the arc has a tendency to spatter the contents out of the crucible.

It is an object of the present invention to provide an improved form of electric furnace having an arc chamber adapted to receive the boat or crucible and having an upper electrode which is horizontally movable, with the movement of the upper electrode restricted so that it cannot assume a position co-axial with the crucible but will be caused to follow a circular path adjacent the edge of the crucible. In this manner the arc takes place between the upper electrode and the walls of the crucible, or adjacent to them, resulting in a more even distribution of heat throughout the contents of the crucible and a more even distribution of carbon, producing a more homogeneous carbide. At no time is it possible for the crucible to be completely covered by the upper electrode.

A further object of the invention is to provide an electric furnace having the above mentioned characteristics wherein the arc chamber has an electrode opening in its top of sufficient size to permit of the movement of the upper electrode, this being not less than twice the size of the diameter of the upper electrode or of the crucible, and to provide a novel construction for closing the top of the electrode opening about the upper electrode to confine the heat.

With the foregoing and other objects in view, which will be made manifest in the following detailed description and specifically pointed out in the appended claims, reference is had to the accompanying drawing for an illustrative embodiment of the invention, wherein:

Fig. 1 is a vertical section through the improved electric furnace embodying the invention.

Fig. 2 is a partial top plan view of the same.

Referring to the accompanying drawing, wherein similar reference characters designate similar parts throughout, the improved electric furnace consists of an arc chamber 10 having a suitable door or entrance 11 and having in its top an electrode opening 12. This arc chamber may be formed of carborundum brick or fire brick, indicated at 13, disposed within a suitable steel shell 14 or other confining and supporting means. A bottom electrode 15 extends through the bottom of the furnace and is supplied with current by means of a flexible conductor 16. This bottom electrode extends through a liner 17 and may have its top hollowed out, as indicated at 18, forming a type of crucible which may be used for melting crude metal. When not so used it is preferably filled with coarsely crushed carbon 19 forming a support for the boat or carbon crucible 20. Removable and replaceable carbon liners 21 may be installed in the arc chamber to protect those portions of the fire brick 13 which are subjected to the most extreme heat. The upper electrode 22, which is formed of carbon, is illustrated as being of the same diameter as the diameter of the crucible 20, although the relative sizes of the upper electrode and crucible may vary. The upper electrode 22 has a diameter not exceeding one-half of the diameter of the upper electrode opening 12. This upper electrode is suspended from an electrode clamp 23 which is vertically slidable on a vertical rack 24, supported on a base plate 25. A shaft 26 is rotatably mounted on the clamp and carries a pinion 27 meshing with the rack. The shaft also has a handle 28 so that on rotation of the shaft the clamp 23 and the upper electrode 22 can be adjusted vertically with respect to the crucible. Any equivalent construction for supporting the electrode 22 on the base plate 25 may be employed. On top of the shell 14 there is a layer of insulating material 29 and on this there is positioned a plate 30 on opposite sides of which there are cranks 31 and 32. These cranks are rotatable about vertical axes and are connected as indicated at 33 and 34 to the base plate 25. A carbon plate 35 has an aperture therethrough so as to fit loosely about the upper electrode 22. This plate is slidable over plate 30 and as plate 30 is insulated from the body of the arc chamber and the lower electrode 15, plate 35 and the upper electrode and its supporting structure are likewise insulated.

The operation and advantages of the improved electric furnace are as follows. If it is desired to manufacture tungsten carbide from tungsten powder, the boat or crucible 20 is filled with the powder and is positioned on the lower electrode 15 at about its center. The upper electrode, which is supplied with current through a flexible cable 36, is then lowered to strike the arc. After the arc has been struck, the upper electrode can be adjusted to give the desired arc and base plate 25, with all structure mounted thereon, can be horizontally moved. This movement can be accomplished by hand by means of handle 28 being forced laterally, rearwardly, or forwardly, causing the cranks 31 and 32 to rotate. The cranks 31 and 32 restrict the horizontal movement of the upper electrode 22 so that at no time can the upper electrode assume a position completely covering the crucible 20. Instead it will be caused to follow a circular path having a diameter approximately equal to that of the crucible 20 so that the center of the upper electrode moves on a path adjacent the upper edge of the crucible. In this manner most of the arcing takes place between the upper electrode and the walls of the crucible, the heat and carbon permeating the tungsten powder by radiation and conduction from the walls of the crucible. As the upper electrode can be continuously moved, the heat will not be localized at any one point through the contents and as a result a more uniform or homogeneous product is possible. During the movement the carbon plate 35 slides on plate 30, closing the top of the electrode opening 12 and confining the heat. The improved furnace is also highly advantageous in that no spattering of the contents of the crucible is entailed. Furthermore in furnaces which arc directly on the contents of the crucible a very close regulation of the voltage is ordinarily necessary, which is not necessary in the improved furnace wherein most of the arcing takes place between the upper electrode and the walls of the crucible.

Various changes may be made in the details of construction without departing from the spirit or scope of the invention as defined by the appended claims.

I claim:

1. An electric furnace comprising means providing an arc chamber, vertically spaced electrodes in the chamber, a work container or crucible in electrical contact with the lower electrode, the upper electrode being horizontally movable, and means for preventing the upper electrode from assuming a position co-axial with the crucible.

2. An electric furnace comprising means providing an arc chamber, vertically spaced electrodes in the chamber, a work container or crucible in electrical contact with the lower electrode, the upper electrode being horizontally movable, and means restricting the movement of the upper electrode to a planetary path of approximately the diameter of the crucible.

3. An electric furnace comprising means providing an arc chamber, vertically spaced electrodes in the chamber, there being an electrode opening in the top of the arc chamber for the reception of the upper electrode, said electrode opening being of not less than twice the diameter of the upper electrode, and means movably supporting the upper electrode so as to permit horizontal movement.

4. An electric furnace comprising means providing an arc chamber, vertically spaced electrodes in the chamber, there being an electrode opening in the top of the arc chamber for the reception of the upper electrode, means movably supporting the upper electrode so as to permit horizontal movement, and a cover loosely fitting about the upper electrode movable therewith over the top of said arc chamber forming means and serving to close the electrode opening about the upper electrode to confine the heat.

5. An electric furnace comprising means providing an arc chamber, vertically spaced electrodes in the chamber, there being an electrode opening in the top of the arc chamber for the reception of the upper electrode, means movably supporting the upper electrode so as to permit horizontal movement, a cover loosely fitting about the upper electrode movable therewith over the top of said arc chamber forming means and serving to close the electrode opening about the upper electrode to confine the heat, and means insulating said cover from the lower electrode.

6. An electric furnace comprising means providing an arc chamber, vertically spaced electrodes in the arc chamber, there being an electrode opening in the top of the chamber for the reception of the upper electrode, a work container or crucible in the arc chamber, said electrode opening being of a diameter of not less than twice the diameter of the upper electrode, means supporting the upper electrode for horizontal movement, said means preventing the upper electrode from assuming a position completely covering over the crucible.

7. An electric furnace comprising means providing an arc chamber, vertically spaced electrodes in the arc chamber, there being an electrode opening in the top of the chamber for the reception of the upper electrode, a work container or crucible in the arc chamber, said electrode opening being of a diameter of not less than twice the diameter of the crucible, and means supporting the upper electrode for horizontal movement, said means restricting the movement of the upper electrode to a planetary path adjacent the upper edge of the crucible.

8. An electric furnace comprising means providing an arc chamber having an electrode opening in its top, vertically spaced electrodes in the chamber, the upper electrode extending through the electrode opening, supporting means adjustably supporting the upper electrode, and means mounting said supporting means upon the arc chamber forming means restricting it to a horizontally circular motion.

9. An electric furnace comprising means providing an arc chamber having an electrode opening in its top, vertically spaced electrodes in the chamber, the upper electrode extending through the electrode opening, supporting means adjustably supporting the upper electrode, and a pair of cranks mounted upon the arc chamber forming means, said supporting means being mounted upon said cranks.

10. An electric furnace comprising means providing an arc chamber having an electrode opening in its top, vertically spaced electrodes in the chamber, the upper electrode extending through the electrode opening, supporting means adjustably supporting the upper electrode, a pair of cranks mounted upon the arc chamber forming means, said supporting means being mounted upon said cranks, and a cover fitting loosely about the upper electrode closing the top of the electrode opening about it, said covering being movable over the top of the arc chamber forming means.

11. An electric furnace comprising means providing an arc chamber having an electrode opening in its top, vertically spaced electrodes in the chamber, the upper electrode extending through the electrode opening, supporting means adjustably supporting the upper electrode, a pair of cranks mounted upon the arc chamber forming means, said supporting means being mounted upon said cranks, a cover fitting loosely about the upper electrode closing the top of the electrode opening about it, said covering being movable over the top of the arc chamber forming means, and means insulating the cover from the body of the arc chamber forming means and the bottom electrode.

12. An electric furnace comprising means providing an arc chamber, said chamber having a substantially horizontal opening for observing the work and substantially vertical openings for the reception of spaced electrodes, the arc chamber being not less than twice the diameter of the upper electrode, means movably supporting the upper electrode so as to permit horizontal and vertical movement, a cover loosely fitting about the upper electrode movable therewith over the top of said arc chamber forming means and serving to close the electrode opening about the upper electrode to confine the heat, and means insulating the upper electrode from the lower electrode.

In testimony whereof I have signed my name to this specification.

JOSEPH T. TERRY.